US008847936B2

(12) United States Patent
Chervenka et al.

(10) Patent No.: US 8,847,936 B2
(45) Date of Patent: Sep. 30, 2014

(54) MANAGING A DISPLAY OF A TERMINAL DEVICE ASSOCIATED WITH A VEHICLE DATA BUS (75) Inventors: Kirk J. Chervenka, Waukee, IA (US); Fangfang Xia, Waukee, IA (US)

(73) Assignee: Deere & Company, Moline, IL (US)

( * ) Notice: Subject to any disclaimer, the term of this patent is extended or adjusted under 35 U.S.C. 154(b) by 614 days.

(21) Appl. No.: 12/894,705

(22) Filed: Sep. 30, 2010

(65) Prior Publication Data

US 2012/0001876 A1 Jan. 5, 2012

Related U.S. Application Data (60) Provisional application No. 61/361,181, filed on Jul. 2, 2010.

(51) Int. Cl.
*G06F 3/038* (2013.01)
*G09G 5/00* (2006.01)
*G07C 5/00* (2006.01)
*G09B 19/16* (2006.01)

(52) U.S. Cl.
CPC ............. *G09G 5/00* (2013.01); *G09G 2380/10* (2013.01); *G07C 5/00* (2013.01); *G09G 2358/00* (2013.01); *G09B 19/167* (2013.01)
USPC ........................................................ 345/208

(58) Field of Classification Search
None
See application file for complete search history.

(56) References Cited

U.S. PATENT DOCUMENTS

| 5,513,107 | A | 4/1996 | Gormley |
| 6,198,996 | B1 * | 3/2001 | Berstis ............................ 701/36 |
| 6,856,878 | B2 | 2/2005 | Braunhardt et al. |
| 2005/0091018 | A1 * | 4/2005 | Craft ................................ 703/8 |
| 2005/0099265 | A1 | 5/2005 | Dix et al. |
| 2005/0215286 | A1 | 9/2005 | Brass et al. |
| 2006/0149442 | A1 * | 7/2006 | Delaney et al. .................. 701/36 |
| 2008/0157920 | A1 | 7/2008 | Groer |
| 2008/0223937 | A1 * | 9/2008 | Preta et al. ..................... 235/492 |

(Continued)

FOREIGN PATENT DOCUMENTS

| EP | 1116840 A2 | 7/2001 |
| GB | 2426363 A * | 11/2006 |
| WO | 2008/044087 | 4/2008 |

OTHER PUBLICATIONS

Stone, M.; McKee, K.; Formwait, C.; Bennewais, R. ISO 11783, An Electronic Communications Protocol for Agricultural Equipmment, pp. 1-17, ASAE Distinguished Lecture #23, Agricultural Equipment Technology Conference.*

(Continued)

*Primary Examiner* — Kent Chang
*Assistant Examiner* — Nathan Brittingham (57) ABSTRACT

A method and system for managing a display of a terminal device comprises supporting communication of the terminal device with one or more first controllers of a first vehicle via a first data bus. A user level is determined of a user of the first vehicle based on an identity of the user as verified by an authentication process. The identity and user level of a corresponding user is stored in the terminal device. Permission data is retrieved on first enabled features and first disabled features for the first vehicle from the one or more first controllers based on the determined user level. The first enabled features are displayed on a display associated with the terminal device consistent with the retrieved permission data.

20 Claims, 7 Drawing Sheets

(56) References Cited

U.S. PATENT DOCUMENTS

| | | | | |
|---|---|---|---|---|
| 2009/0011389 | A1* | 1/2009 | Sizov | 434/66 |
| 2009/0228175 | A1 | 9/2009 | Borgesson | |
| 2009/0259588 | A1 | 10/2009 | Lindsay | |
| 2010/0001967 | A1* | 1/2010 | Yoo | 345/173 |
| 2011/0254655 | A1* | 10/2011 | Maalouf et al. | 340/3.1 |
| 2012/0023573 | A1* | 1/2012 | Shi | 726/17 |
| 2012/0303177 | A1* | 11/2012 | Jauch et al. | 701/1 |

OTHER PUBLICATIONS

ISO/FDIS 11783-6, ISO International Organization for Standardization. Abstract. (Retrieved from Internet: <URL: http://www.iso.org/iso/home/store/catalogue_tc/catalogue_detail.htm?csnumber=42725>.*

European Search Report dated Dec. 27, 2011, 7 pages.

Stone, M.; KcKee, K.; Formwalt, C.; Benneweis, R. ISO 11783: An Electronic Communications Protocol For Agricultural Equipment, pp. 1-17. ASAE Distiguished Lecture #23. Agricultural Equipment Technology Conference,. Feb. 7-10, 1999, Louisville, Kentucky, USA. ASAE Publication No. 913C1798. Retrieved from the Internet: <URL: http://asae.frymulti.com/data/pdf/6/ddp2002/lecture23.pdf>.

ISO 11783-6:2004. ISO International Organization for Standardization. Abstract. (Retrieved from the Internet: <URL:http://www.iso.org/iso/iso_catalogue/catalogue_tc/catalogue_detal.htm?csnumber=25242>.

ISO/FDIS 11783-6. ISO International Orgainzation for Standardization. Abstract. (Retrieved from the Internet: <URLhttp://www.iso.org/iso/iso_catalogue/catalogue_tc/catalogue_detail.htm?csnumber=42725>.

* cited by examiner

//MANAGING A DISPLAY OF A TERMINAL DEVICE ASSOCIATED WITH A VEHICLE DATA BUS

This document (including the drawings) claims priority and the benefit of the filing date based on U.S. provisional application No. 61/361,181, filed Jul. 2, 2010 under 35 U.S.C. §119 (e), where the provisional application is hereby incorporated by reference herein.

FIELD OF THE INVENTION

This invention relates to a method and system for managing a display of terminal device associated with a vehicle data bus.

BACKGROUND OF THE INVENTION

Certain prior art work vehicles, such as agricultural machines or other heavy equipment, tend to require skilled operators to avoid misuse or abuse of the work vehicles. If a less skilled or inexperienced operator uses a work vehicle, the owner or manager of the work vehicle may wish to restrict access of the operator to certain machine functions of the vehicle to reduce risk of misuse or abuse of the vehicle, among other things, for example. Thus, there is a need for an improved method and system for managing the display of a terminal device associated with a vehicle data bus of the work vehicle.

SUMMARY OF THE INVENTION

In accordance with one embodiment, a method and system for managing a display of a terminal device comprises supporting communication of the terminal device with one or more first controllers of a first vehicle via a first data bus. A user level is determined of a user of the first vehicle based on an identity of the user as verified by an authentication process. The identity and user level of a corresponding user is stored in the terminal device. Permission data is retrieved on first enabled features and first disabled features for the first vehicle from the one or more first controllers based on the determined user level. The first enabled features are displayed on a display associated with the terminal device consistent with the retrieved permission data. In accordance with another embodiment, multiple terminal devices may be coupled to one or more vehicle data buses with different access configurations for users.

DESCRIPTION OF THE PREFERRED EMBODIMENT

Figure 1:
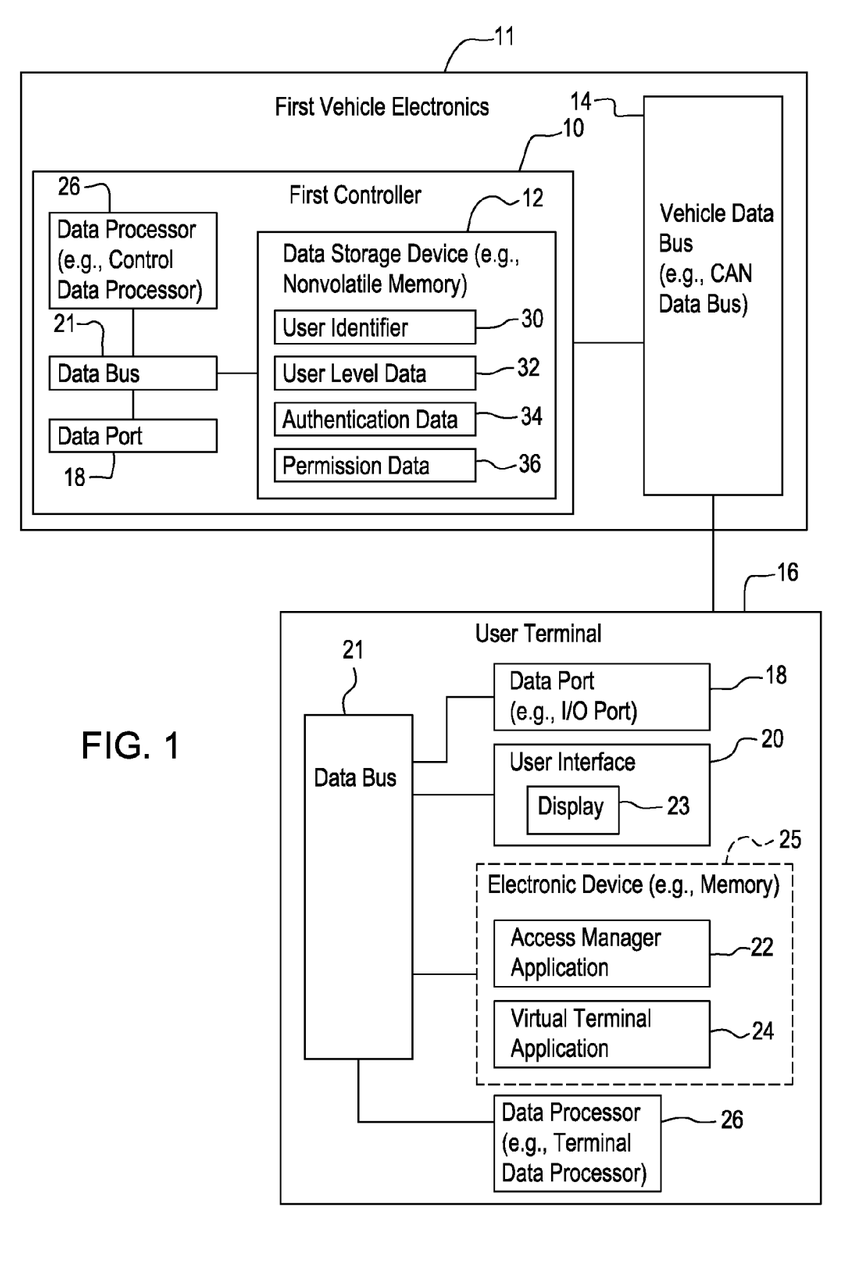
FIG. 1 is a block diagram of a first embodiment of a system for managing a display of terminal device associated with a vehicle data bus.

In accordance with one embodiment, FIG. 1 illustrates an electronic data processing system or computer-implemented system for managing a display 23 of terminal device 16 associated with a vehicle data bus 21. First vehicle electronics 11 are coupled to or removably coupled to a user terminal 16. In one embodiment, the user terminal 16 may comprise a portable user terminal (e.g., portable display) that can be transferred from one vehicle to another vehicle. For example, the user terminal 16 may be connected to a data port 18 of first vehicle electronics 11 of a first vehicle or second vehicle electronics (e.g., 111 in FIG. 2) of a second vehicle by a transmission line or wireless connection.

Each work vehicle may have a different security configuration or user access that is readily recognized by the terminal 16, where multiple security configurations or user access for vehicle are possible based on an identity of the user. The terminal 16 does not need any prior or a priori knowledge of the security configuration, features, or access level of any vehicle on which it is installed or moved to from a previous vehicle. Rather, the terminal 16 is capable of cooperating with first controller 10 or other controller in the vehicle electronics to preserve restricted access, lockout restrictions, and permission data on a user-by-user basis, such that the same work vehicle can have different configurations for different corresponding users, based on a respective user level. The owner of the vehicle or a designated administrator with administrative authority over the vehicle electronics in a work vehicle may establish user level for a corresponding user based on the user's experience with the work equipment, a diagnostic test on a work vehicle simulator, or other measure of proficiency to prevent damage or misuse of the work vehicle, while supporting multiple operators (e.g., skilled or unskilled) for use of the same work vehicle.

The first vehicle electronics 11 comprises a first controller 10 connected to a vehicle data bus 14 (e.g., Controller Area Network (CAN) data bus). The first controller 10 further comprises a data processor 26, a data bus 21, a data storage device 12, and a data port 18. The data processor 26 may communicate with the data storage device 12, the data port 18, or both via the data bus 21.

The data processor 26 may comprise a microprocessor, a microcontroller, a programmable logic array, application specific integrated circuit, a logic circuit, a computer, or another electronic device for processing, inputting, or outputting data. The data processor 26 in the first controller 10 may be referred to as the control data processor, whereas the data processor 26 in the terminal 16 may be referred to as the terminal data processor. Similarly, in this document for identification purposes and clarity, any elements of the first controller may use the prefix "control" to distinguish those elements from similar elements of the user terminal, where the elements of the user terminal may use the prefix "terminal."

The data storage device 12 may represent any device or physical storage medium that is capable of storing data. For example, the data storage device 12 may comprise electronic memory, nonvolatile memory, random access memory, magnetic data storage, optical data storage, a hard disc, or another storage device for storing, retrieving, writing, reading, refreshing or recording data. The data storage device 12 may store application programs, computer programs or computer instructions, or software modules for execution by the electronic data processor 26. As illustrated in FIG. 1, the data storage device 12 stores one or more of the following data records, data files or data: a user identifier 30, a user level data 32, authentication data 34, and permission data 36.

A user identifier 30 is a code, symbol, word, alphanumeric, numeric, or binary identifier for a respective user or operator of the vehicle, or an administrator or service technician who manages security settings for the vehicle or its owner.

User level data 32 provides a user level assigned to a corresponding operator or user. User levels may be administrator-defined, factory defined or may be based on a respective operator's skill, experience or diagnostic test results administered by the first vehicle electronics or a vehicle simulation unit. For example, each user may be assigned a user level or skill level rating, which may be expressed as a numerical rating or otherwise. If an operator or user has a greater user level or skill level than a lesser user with a corresponding lesser skill level, the first vehicle electronics 11 or first controller 10 will provide greater access to the vehicle features and settings to the greater user. The greater access of a user with a greater user level may be defined as allowing the greater user to do one or more of the following: (a) to observe locked features, unlocked features, locked settings, and unlocked settings to a greater extent than the lesser user with a lesser user level would be able to do, or (b) to modify, change, define or select a greater extent of features and settings than an lesser user with a lesser user level would be able to do.

Permission data 36 may be associated with a corresponding user identifier and corresponding level data assigned to the user identifier. The permission data 36 may be stored as a matrix, data record, or file that lists or defines accessible applications, screen configurations, displayable features of the vehicle, implement or vehicle electronics; displayable settings of the vehicle, implement or vehicle electronics; modifiable features of the vehicle, implement, or vehicle electronics; and modifiable settings of the vehicle, implement, or vehicle electronics.

Authentication data 34 means a user identifier (e.g., log-in identifier) and a corresponding password or other authentication record, file or data, such as security questions and answers.

The data port 18 may comprise a communications device, a transceiver, a wireline transceiver, or another input/output device for communicating over a communications line, a vehicle data bus 14 (e.g., Controller Area Network (CAN) data bus), or data bus 21, or both databuses (14, 21).

The data bus 21 may comprise a physical data path, a logical data path, or both that supports the transmission of logic levels, symbols, words, bits, bytes or other formats of data.

A user terminal 16 comprises a data processor 26, an electronic device 25 (e.g. memory), a user interface 20, a data port 18, and a data bus 21. The data processor 26 may communicate with the electronic device 25, the user interface 20, and the data port 18 via the data bus 21.

The user interface 20 may comprise a device that supports the input, output, or display 23 of data for a user. The user interface 20 may comprise a display 23 and one or more of the following: a keyboard, a keypad, a switch, a pointing device (e.g., an electronic mouse or track ball), or touch screen capability for the display 23.

The electronic device 25 may represent any device or physical storage medium that is capable of storing data. For example, the data storage device 12 may comprise electronic memory, nonvolatile memory, random access memory, magnetic data storage, optical data storage, a hard disc, or another device for storing, retrieving, writing, reading, refreshing or recording data.

The electronic device 25 may store one or more application programs, software, or instructions. For example, the electronic device 25 may store an access manager application 22 and a virtual terminal application 24. The data processor 26 may access or retrieve instructions or data from the access manager application 22, the virtual terminal application 24, or both via the data bus 21. The access manager application 22 determines one or more of the following based on permission data 36 and a corresponding user identifier 30: (1) whether to display a locked status (e.g., locked symbol on the display 23) or unlocked state (e.g., an unlocked symbol on the display 23) for a particular feature, application, or setting of a vehicle, vehicle electronics or an implement, or (2) whether to hide restricted or locked status material from a respective particular user, or (3) whether to allow, restrict or prohibit user access to certain features for a particular vehicle certain features or settings for a particular, vehicle implement or software.

The terminal 16, or its data processor 26, in conjunction with the virtual terminal application 24, may establish or support a virtual terminal plus mode in which a user can create or modify permission data 36 stored in the first controllers 10, wherein the virtual terminal plus mode is compatible with a virtual terminal mode supported under International Organization for Standardization (ISO) 11783, Part 6. The terminal, or its data processor 26, in conjunction with the virtual terminal application 24, may prohibit modification or creation of permission data 36 stored in the first controllers 10 in a virtual terminal standard mode as defined under virtual terminal specifications set forth in International Organization for Standardization (ISO) 11783, Part 6. This document hereby incorporates by reference ISO/FDIS 11783-6, Tractors and machinery for agriculture and forestry—Serial control and communications data network—Part 6: Virtual Terminal, which is available online at "http://www.iso.org/iso/iso_catalogue, as of the filing date of this document.

Under one embodiment, each first controller 10 creates permission data 36 associated with numerical values representative of an enabled feature or a disabled feature of the vehicle or an implement associated with the vehicle. The permission data 36 is stored on the data storage device 12, as previously noted. Further, each first controller 10 is capable of preventing a user from accessing or controlling disabled features of the vehicle in accordance with the numerical values.

Figure 2:
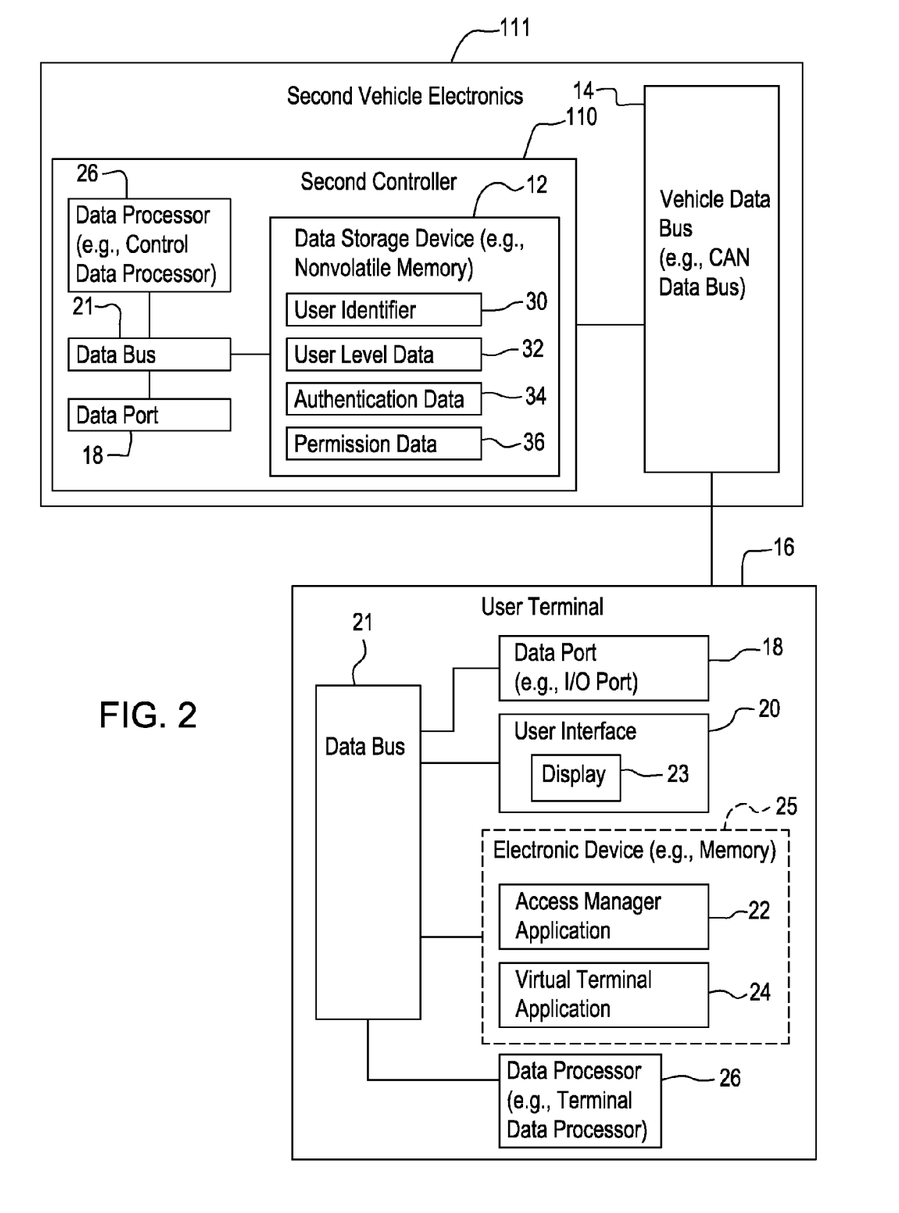
FIG. 2 is a block diagram of a second embodiment of a system for managing a display of terminal device associated with a vehicle data bus.

The system of FIG. 2 is similar to the system of FIG. 1, except the system of FIG. 2 further comprises second vehicle electronics 111, instead of first vehicle electronics 11. The second vehicle electronics 111 may be associated with or mounted on a second vehicle, whereas the first vehicle electronics 11 may be associated with or mounted on a first vehicle. The second vehicle electronics 111 comprises a second controller 110. The second vehicle electronics 111 of FIG. 2 is the same or substantially similar to the first vehicle electronics 11 of FIG. 1, except the second vehicle electronics 111 may store different data in the data storage device 12 that is specific to or related to the second vehicle, or an operator of the second vehicle. For example, the data storage device 12 of the second vehicle electronics 111 or the second controller 110 may store a user identifier 30, a user level data 32, authentication data 34, and permission data 36 that are tailored to the second vehicle, as opposed to the first vehicle. The user level data 32 may support different functions, functionality, disabled features, or enabled features for the first vehicle electronics 11 and the second vehicle electronics 111. However, the same user terminal 16 is configured to work with the first vehicle electronics 11 (and its first controller 10) and the second vehicle electronics 111 (and its second controller 110). Accordingly, a user or operator may disconnect the terminal 116 from the first vehicle electronics 11 and reconnect it to the second vehicle electronics 111 such that the particular user has the same level of access and restrictions to features and settings. In one example, particular features or settings may have a respective locked status (e.g., locked symbol) or a respective unlocked status (e.g., unlocked symbol) displayable on a screen of the display 23.

Figure 3:
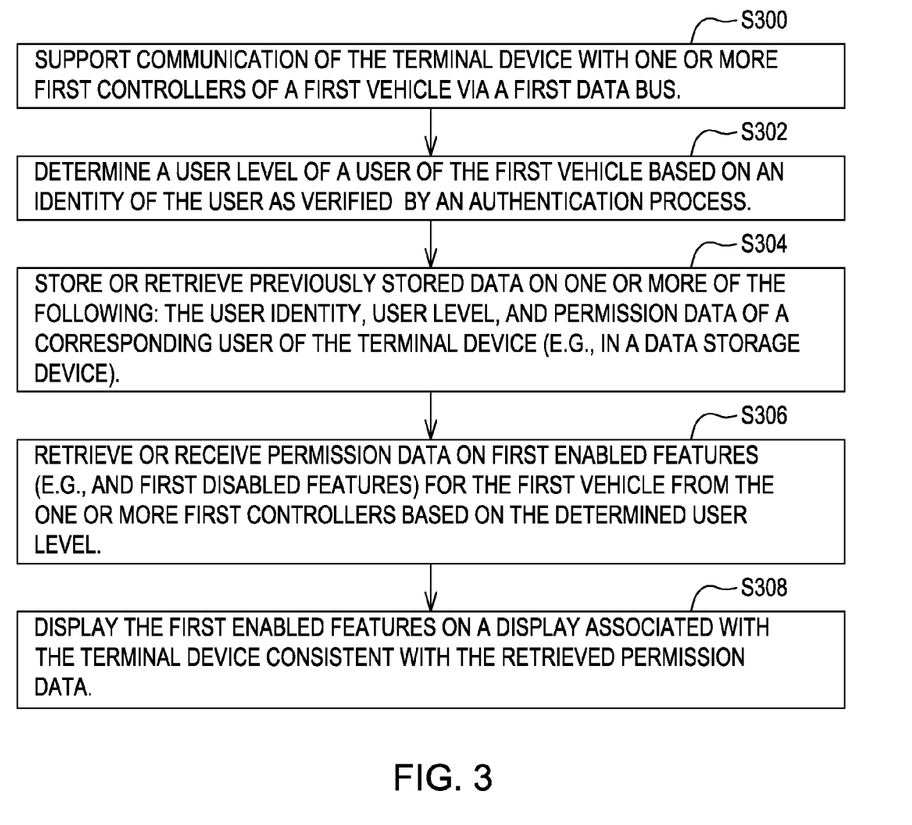
FIG. 3 is a flow chart of a first example of a method for managing a display of terminal device associated with a vehicle data bus.

FIG. 3 is a flow chart of a first example of a computer-implemented method for managing a display 23 of terminal device associated with a vehicle data bus 14. The method of FIG. 3 begins in step S300. In preparation for step S300, the terminal device is docked into a docking station in the first vehicle, or connected to a data port 18 of first vehicle electronics 11 of the first vehicle through a transmission line, electrical connector, or wireless connection.

In step S300, the data port 18 or the terminal data processor 26 of the terminal 16 supports communication of the terminal 16 with one or more first controllers 10 of a first vehicle via a first data bus (e.g., vehicle data bus 14 in FIG. 1). In one configuration, the terminal 16 comprises a portable terminal device that can be moved from the first vehicle to a second vehicle.

In step S302, the control data processor 26 or the first vehicle electronics 11 determines if a user level of a user of the first vehicle based on an identity of the user, as verified by an authentication process. For example, the first vehicle electronics 11 may prompt the user for an identifier (e.g., log-in identifier) and a corresponding password via the display 23 or user interface 20 of the user terminal 16. The first vehicle electronics 11 may transmit a security or authentication prompt to the user terminal 16 via the data ports 18 and vehicle data bus 21. Further, the vehicle electronics 11 may receive a reply or response to the prompt that a user enters via the user interface 20, where the reply or response is received via the vehicle data bus 24, the data bus 21, and data port 18. The control data processor 26 decides whether or not to grant access to the vehicle electronics 11 (or associated applications, features or settings) to a particular user based on proper entry of a corresponding user identifier and password, subject to any supplemental authentication process. For instance, a supplemental authentication process may require a user to answer accurately one or more security questions in addition to the proper entry of the user identifier and respective password. The control data processor 26 may retrieve user level data corresponding to the respective user identifier upon successful completion of the authentication process.

In an alternative embodiment, other authentication processes (e.g., as a supplemental authentication process or otherwise) may be used such as a detection device that reads or detects biometric markers, finger prints, retinal scanning, facial pattern matching, or otherwise. The detection device may be associated with the user interface 20, for instance.

In step S304, based on the authenticated user identifier 30 of the user, a control data processor 26, data storage device 12, or first vehicle electronics 11 stores or retrieves previously stored data concerning one or more of the following: the identity (e.g., user identifier), user level, and permission data 36 of a corresponding user of the terminal device (e.g., in a data storage device 12). Step S304 may be accomplished in accordance with various processes, which may be applied alternately or cumulatively. Under a first process, a terminal processor 26 or terminal 16 may establish a virtual terminal plus mode in which a user can create or modify permission data 36 stored in the first controllers 10, wherein the virtual terminal plus mode is compatible with a virtual terminal mode supported under International Organization for Standardization (ISO) 11783, Part 6. The storage, creation or modification of permission data may require an administrator status or a technician status of the user, for example.

Under a second process, a terminal data processor 26 or terminal 16 may prohibit modification or creation of permission data 36 stored in the first controllers 10 in a virtual terminal standard mode as defined under virtual terminal specifications set forth in International Organization for Standardization (ISO) 11783, Part 6. The storage, creation or modification of permission data 36 may be prohibited for ordinary users or operators, who do not have administrator or technician status granted by the owner of the vehicle, for example.

Under a third process, each first controller 10 creates permission data 36 associated with numerical values representative of an enabled feature or a disabled feature of the vehicle or an implement associated with the vehicle. Further, each first controller 10 is capable of preventing a user from accessing or controlling disabled features of the vehicle in accordance with the numerical values.

In step S306, a terminal data processor 26 or user terminal 16 retrieves or receives permission data 36 on first enabled features and first disabled features for the first vehicle from the one or more first controllers 10 based on the determined user level or user level data 32. In one embodiment, the first enabled features comprise objects for display 23 on the display 23 consistent with International Organization for Standardization (ISO) 11783, Part 6.

In step S308, the user interface 20, display 23, or the user terminal displays the first enabled features on a display 23 associated with the terminal device consistent with the retrieved permission data 36. The first enabled features may be displayed as unlocked symbols as illustrated in the screen shots of FIG. 5 through FIG. 7, which will be explained later in greater detail. Step S308 may be carried out in accordance with various techniques that may be applied alternately or cumulatively. Under a first technique, the user interface 20, display 23, or the user terminal may display 23 the first disabled features on the display 23 to indicate that the user's access to the first disabled features is prohibited. The first disabled features may be displayed as locked symbols as illustrated in the screen shots of FIG. 5 through FIG. 7, which will be explained later in greater detail. Under a second technique, the user interface 20, display 23 or terminal 16 may not display disabled features or may hide disabled features on the display 23 associated with the terminal device consistent with the retrieved permission data 36. Accordingly, where only the first enabled features are displayed on the terminal device, the user may be unaware of even the existence of the disabled features, whereas when the first disabled features are displayed on the terminal device the user is aware of the existence of the disabled, restricted-access, or prohibited features.

Figure 4:
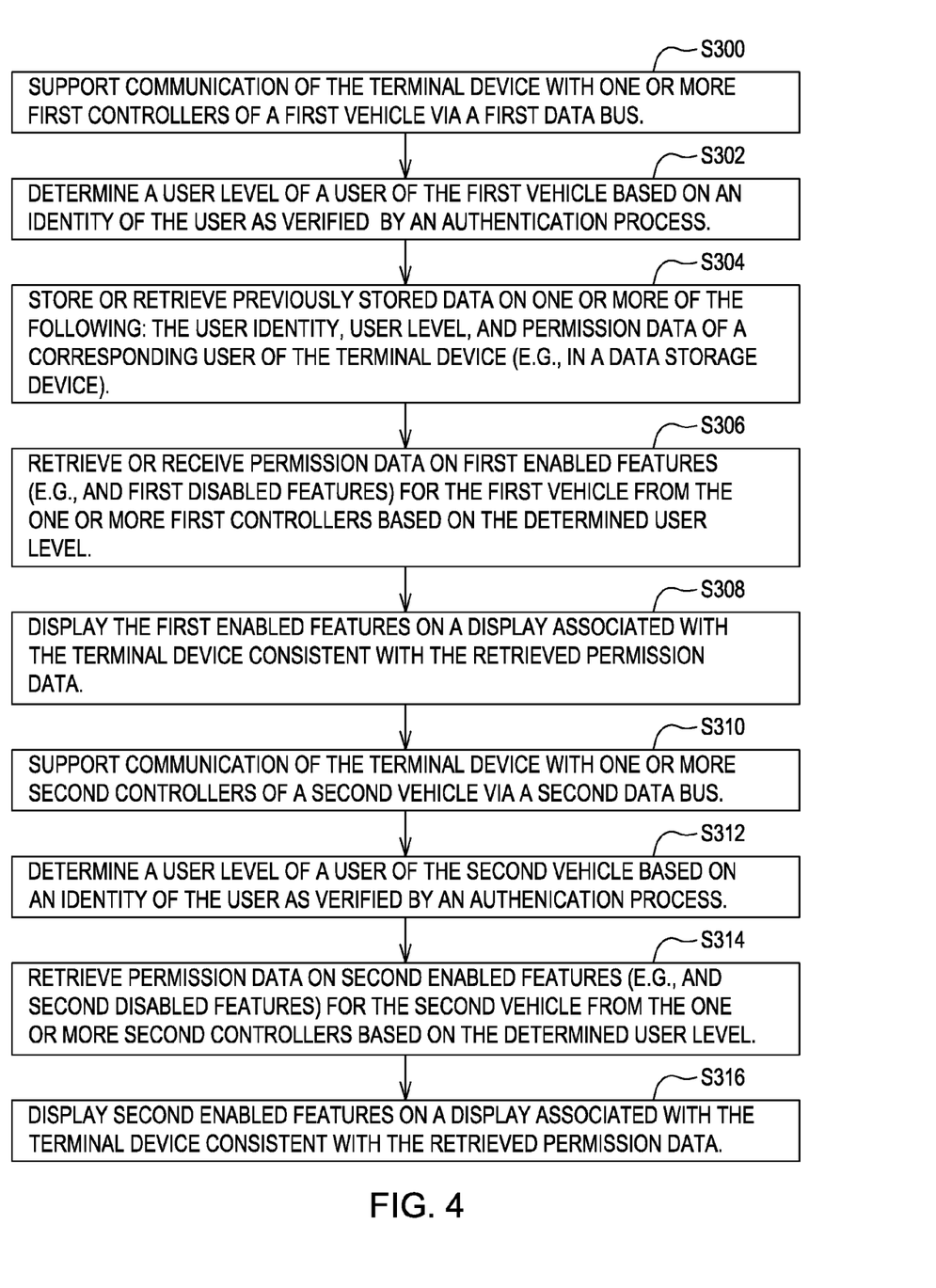
FIG. 4 is a flow chart of a second example of a method for managing a display of terminal device associated with a vehicle data bus.

FIG. 4 is a flow chart of a second example of a computer-implemented method for managing a display 23 of terminal device 16 associated with a vehicle data bus 21. The method of FIG. 4 is similar to the method of FIG. 3, except the method of FIG. 4 further comprises steps S310, S312, S314, and S316. Like reference indicators indicate like steps or procedures in FIG. 3 and FIG. 4.

Step S310 may be executed after step S308, for example. In preparation for step S310, the terminal device 16 may be moved from the first vehicle to a second vehicle, where the terminal device is docked into a docking station in second vehicle, or connected to a data port 18 of second vehicle electronics of the second vehicle through a transmission line, electrical connector, data cable (e.g., Universal Serial Bus (USB) cable), or wireless connection.

In step S310, the data port 18 or the terminal data processor 26 of the terminal 16 supports communication of the terminal device 16 with one or more second controllers of a second vehicle via a second data bus (e.g., vehicle bus 14 in FIG. 2).

In step S312, the control data processor 26 or the second vehicle electronics 111 determines if a user level of a user of the second vehicle based on an identity of the user, as verified by an authentication process. For example, the second vehicle electronics 111 may prompt the user for an identifier (e.g., log-in identifier) and a corresponding password via the display 23 or user interface 20 of the user terminal 16. The second vehicle electronics 111 may transmit a security or authentication prompt to the user terminal via the data port 18 and vehicle data bus 14. Further, the second vehicle electronics 111 may receive a reply or response to the prompt that a user enters via the user interface 20, where the reply or response is received via the vehicle data bus 21, and data port 18. The control data processor 26 decides whether or not to grant access to the vehicle electronics 11 (or associated applications, features or settings) to a particular user based on proper entry of a corresponding user identifier and password, subject to any supplemental authentication process. For instance, a supplemental authentication process may require a user to answer accurately one or more security questions in addition to the proper entry of the user identifier and respective password. The control data processor 26 may retrieve user level data corresponding to the respective user identifier upon successful completion of the authentication process.

In an alternative embodiment, other authentication processes may be used such as a detection device that reads or detects biometric markers, finger prints, retinal scanning, facial pattern matching, or otherwise. The detection device may be associated with the user interface 20, for instance.

In step S314, a terminal data processor 26 or user terminal retrieves or receives permission data 36 on second enabled features and second disabled features for the second vehicle from the one or more second controllers 110 based on the determined user level. In one embodiment, the second enabled features comprise objects for display 23 on the display 23 consistent with International Organization for Standardization (ISO) 11783, Part 6.

In step S316, the user interface 20, display 23, or the user terminal displays the second enabled features on a display 23 associated with the terminal device consistent with the retrieved permission data 36. The second enabled features may be displayed as unlocked symbols as illustrated in the screen shots of FIG. 5 through FIG. 7, which will be explained later in greater detail. In an alternate embodiment, the user interface 20, display 23, or the user terminal may display 23 the second disabled features on the display 23 to indicate that the user's access to the second disabled features is prohibited. The second disabled features may be displayed as locked symbols as illustrated in the screen shots of FIG. 5 through FIG. 7. Accordingly, where only the second enabled features are displayed on the terminal device, the user may be unaware of even the existence of the disabled features, whereas when the second disabled features are displayed on the terminal device the user is aware of the existence of the disabled, restricted-access, or prohibited features.

Figure 5:
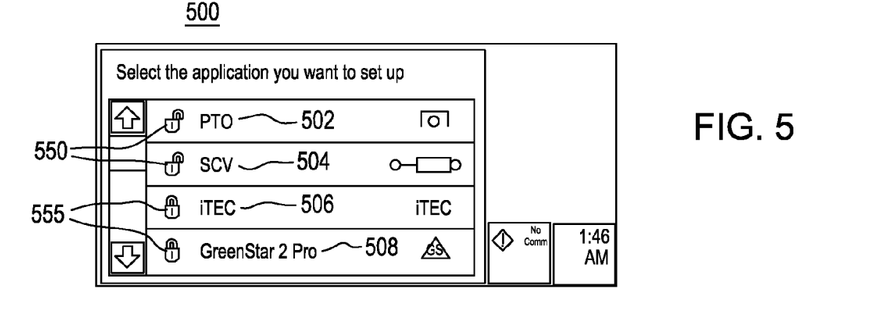
FIG. 5 through FIG. 9, inclusive, are illustrative screen shots of the display of a terminal device consistent with the system and method of the other drawings.

FIG. 5 is an illustrative example of a first screen shot 500 that may be displayed to a user of the terminal or operator of the vehicle. Other screen configurations fall within the scope of the claims and the disclosure. The screen shot 500 of FIG. 5 allows a user to select from a menu of control or configuration applications to configure a first application 502 (e.g., power take-off shaft (PTO) features), a second application 504 (e.g., the hydraulic selective control valve multiplier (SCV) features), a third application 506 (e.g., the Intelligent Total Equipment Control (iTEC) equipment features), and a fourth application 508 (e.g., GreenStar 2 Pro data processing system and display 23 features). GREENSTAR is a trademark of Deere & Company. Subject to proper authorization, the user may establish settings, parameters, options, configurations or otherwise configure one or more of the following: the first application 502, the second application 504, the third application 506, and the fourth application 508 via selection of one or more items from the menu displayed in FIG. 5. If the user has administrator, technician or factory authorization, the user may establish security or access settings for other users of the terminal via the screen shots depicted in FIG. 5 through FIG. 7, inclusive. The locked symbol 555 indicates that a user (e.g., except for an administrator authorized by the vehicle owner) does not have authorized access to a particular corresponding feature, setting or menu item; whereas the unlocked symbol 550 indicates that a user has authorized access to a particular corresponding feature, setting or menu item. Each locked symbol 555 or unlocked symbol 550 shown in FIG. 5 is associated with the feature, setting or menu item to such symbols immediate right.

The PTO is a device that provides rotational energy to an implement or other device that is connected to the PTO shaft. The PTO feature may have settings related to torque, allowed slippage, maximum rotational speed of the shaft, minimum rotational speed of the shaft, direction of rotation of the shaft, or other settings.

The SCV works to configure the hydraulic system of the work vehicle to support control of implements, tools or other devices that can be coupled to hydraulic couplers of the work vehicle, for example.

iTEC Pro, which stands for intelligent Total Equipment Control, supports automated end turns (at the boundaries of work areas) of the work vehicle (and associated implement control (e.g., lifting of a combine head or cultivator) in conjunction with a data processing system (e.g., navigation or guidance computer) and a location-determining receiver (e.g., Global Positioning System (GPS) receiver).

In one embodiment, the terminal 16 may comprise a GreenStar 2 Pro electronic data processing system and display 23. The terminal 16 (e.g., GreenStar 2 Pro data processing system and display 23) may support features such as automated steering, navigation or guidance of the vehicle, swath control of the vehicle, and the like. The display 23 may have a user interface 20 that is equipped with integrated control buttons, a keypad, a keyboard, or touch screen functionality for providing operator input to the data processing system. The GreenStar 2 Pro data processing system and display 23 may support monitoring functions such as fan speed, ground speed, shaft speed of power take-off shafts, bin level, area coverage (e.g., to eliminate skipped rows and gaps with automated navigation or guidance solutions), change in application of crop inputs, or other functions.

Figure 6:
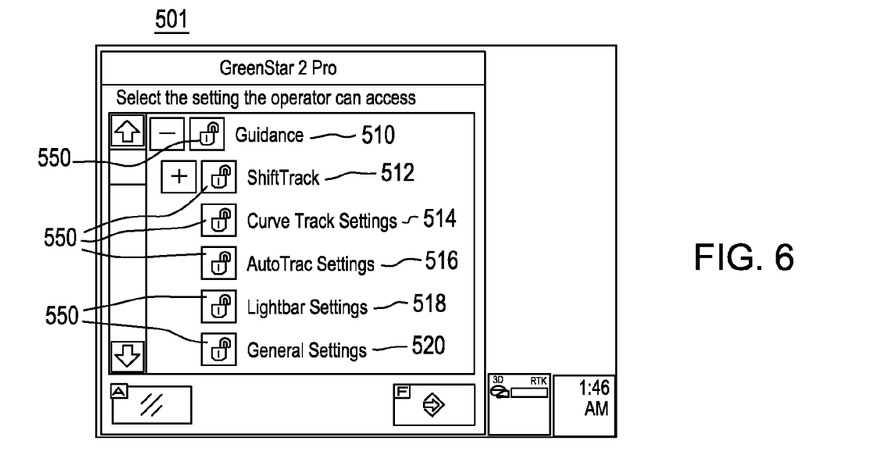

FIG. 6 provides an illustrative example of a second screen shot 501 of the display 23 after a user is authorized to select and selects the fourth application 508 (e.g., GreenStar 2 Pro) from the menu displayed in FIG. 5 for configuring. Prior to the user's selection of the fourth application 508 in FIG. 5 via the terminal 16, the fourth application 508 (e.g., GreenStar 2 Pro) needs to be set, by the administrator, factory, or technician, to an accessible state or an unlocked state, as opposed to the inaccessible or locked state indicated by the locked symbol 555 to the left of the fourth application 508 in FIG. 5.

The second screen shot 501 displays an additional menu or sub-menu of the following features: first settings 510 (e.g., Guidance settings), second settings 512 (e.g., ShiftTrack), third settings 514 (e.g., Curve Track settings), fourth settings 516 (e.g., AutoTrac settings), fifth settings 518 (e.g., Lightbar settings), and sixth settings 520 (e.g., General settings). The first settings 510 represent parent settings, whereas the other settings (512, 514, 516, 518 and 520) may represent child settings of the parent settings that share certain characteristics with the parent settings 510. If the first setting 510 represents a parent setting, its child settings that depend from the parent setting have or inherit the same unlocked or locked status. For example, as indicated by the unlocked symbols 550 in FIG. 6, both the parent settings (e.g., first setting 510) and the child settings (e.g., settings 512, 514, 516, 518 and 520) are unlocked. AUTOTRAC is a trademark of Deere & Company.

The first setting 510 (e.g., guidance settings) may provide access to configurations related to automated guidance, path planning, path execution, control or navigation of the vehicle in conjunction with a location-determining receiver (e.g., Global Positioning System (GPS) receiver), an inertial measurement unit, an accelerometer, a gyroscope, a tilt sensor or another navigational device. ShiftTrack relates to a feature of the navigation in which a vehicle is controlled to make parallel tracking paths that track or are parallel to a reference path of the vehicle or swath in the crop, with or without a defined overlap between adjacent paths of the vehicle. Curve Track settings relates to a navigation feature in which the work vehicle is controlled to make curved tracking paths that track or are parallel to a reference curved path or swath in the crop, with or without a defined overlap between adjacent paths of the vehicle. AutoTrac settings relate to settings and the configuration of the location-determining receiver or an associated sensor that measures position, velocity, acceleration, tilt, roll, or yaw of the work vehicle. The AutoTrac settings may allow a user to select a certain level of precision of the received correction signal associated with the location-determining receiver, or to select position compensation for rolling or hilly terrain, for example. The Lightbar settings relate to an array of lights or another optical device that an operator observes to steer a vehicle down a programmed path. For instance, the light bar may be configured as a generally linear row of displayed lights, a generally linear row of light emitting diodes, or another light source or device. The light bar provides feedback on the yaw or heading of the vehicle to maintain a defined path or course for the vehicle. General settings may relate to other settings of parameters that relate to the vehicle, implement, or electronics, sensors, controllers, actuators or software associated with the vehicle or the implement.

Here, in FIG. 6, the unlocked symbol 550 shows that the particular user or operator is not prevented or prohibited from accessing the Guidance configuration features or certain Guidance configuration features. The user or operator can access the second settings 512 (e.g., ShiftTrack), the third settings 514 (e.g., Curve Track settings), the fourth settings 516 (e.g., AutoTrac settings), fifth settings 518 (e.g., Lightbar settings) and sixth settings 520 (e.g., General settings), as indicated by the unlocked symbols 550 to the left of each setting or feature description. Access to features or settings display of additional screens, menu-driven screens on the display 23 with corresponding permission to view, modify, read or write certain settings and features.

Figure 7:
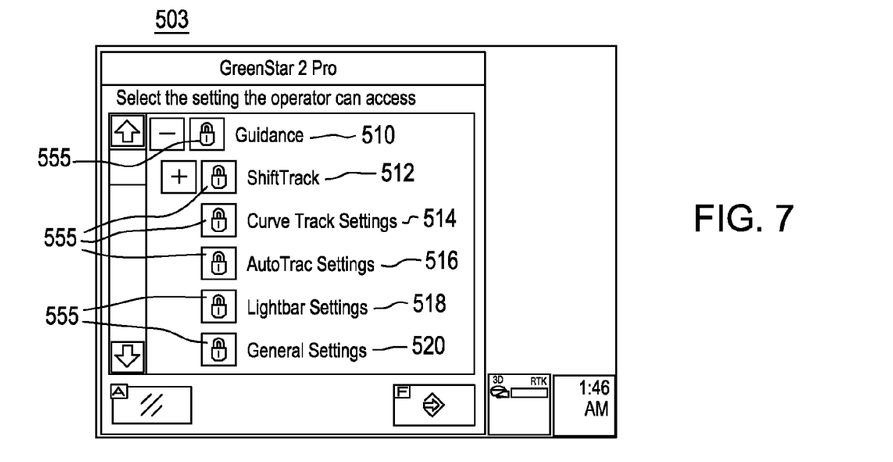

The screen shot 503 of FIG. 7 is similar to the screen shot 501 of FIG. 6, except the screen shot 503 provides that the user or operator cannot access first setting 510 (e.g., Guidance), the second settings 512 (e.g., ShiftTrack), the third settings 514 (e.g., Curve Track settings), the fourth settings 516 (e.g., AutoTrac settings), the fifth settings 518 (e.g., Lightbar settings) and sixth settings 520 (e.g., General settings), as indicated by the locked symbols 555 to the left of each setting or feature description.

Figure 8:
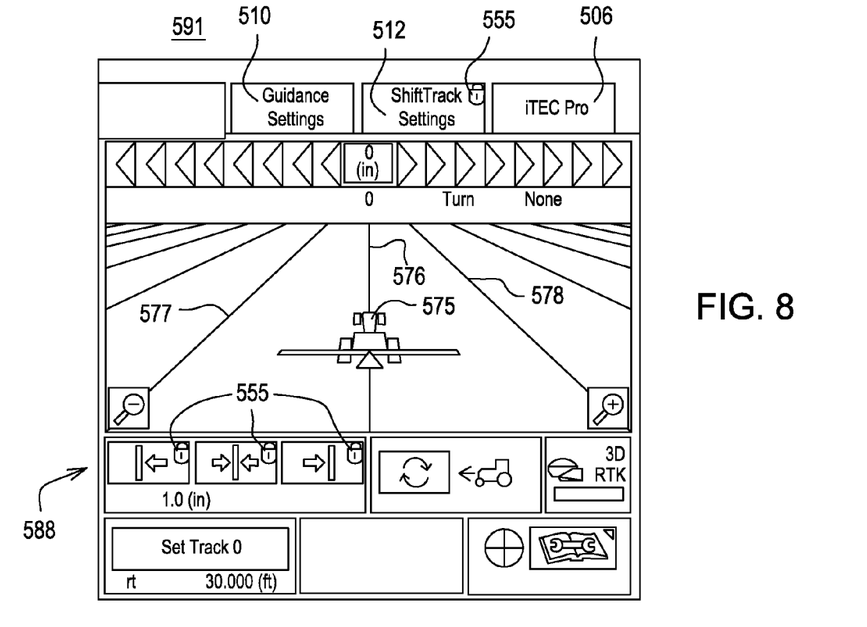

FIG. 8 discloses another illustrative screen shot 591 that is capable of being displayed on the display 23 of the terminal 16. The screen shot 591 illustrates the second settings 512 (e.g., ShiftTrack settings). Here, in FIG. 8 the screen shot 591 provides that the user or operator cannot access the second settings 512 or their sub-features or child features 588 displayed in FIG. 8, as indicated by the locked symbols 555. The screen shot further illustrates the work vehicle 575 on a reference path 576 with generally parallel secondary paths (577, 578) on each side of the reference path 576.

Figure 9:
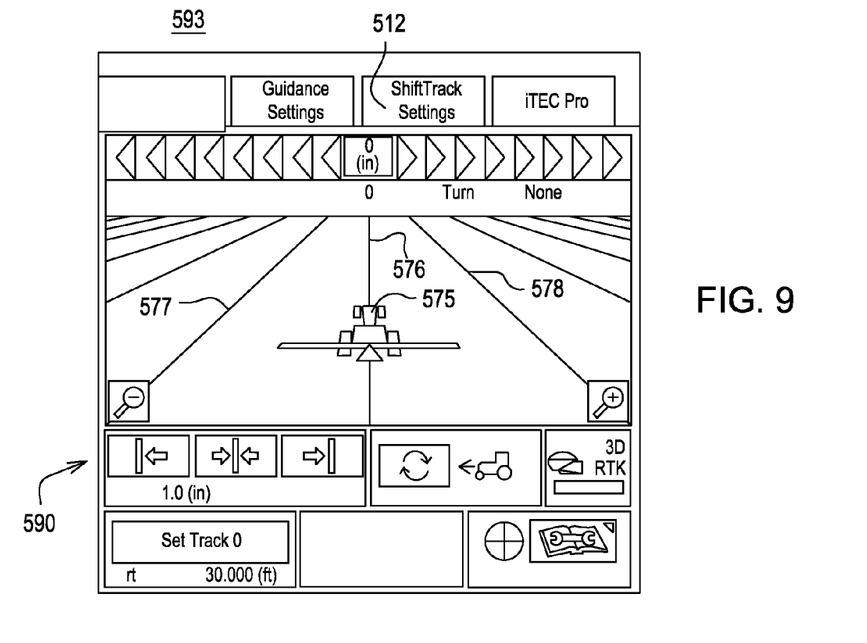

FIG. 9 discloses yet another illustrative screen shot 593 that is capable of being displayed on the display 23 of the terminal. The screen shot 593 illustrates the second settings 512. Here, in FIG. 9, the screen shot 593 provides that the user or operator can access the second settings 512 or their sub-features or child features 590 displayed in FIG. 8, as indicated by the absence of locked symbols 555 or unlocked symbols. The screen shot further illustrates the work vehicle 575 on a reference path 576 with generally parallel secondary paths (577, 578) on each side of the reference path 576.

Figure 10:
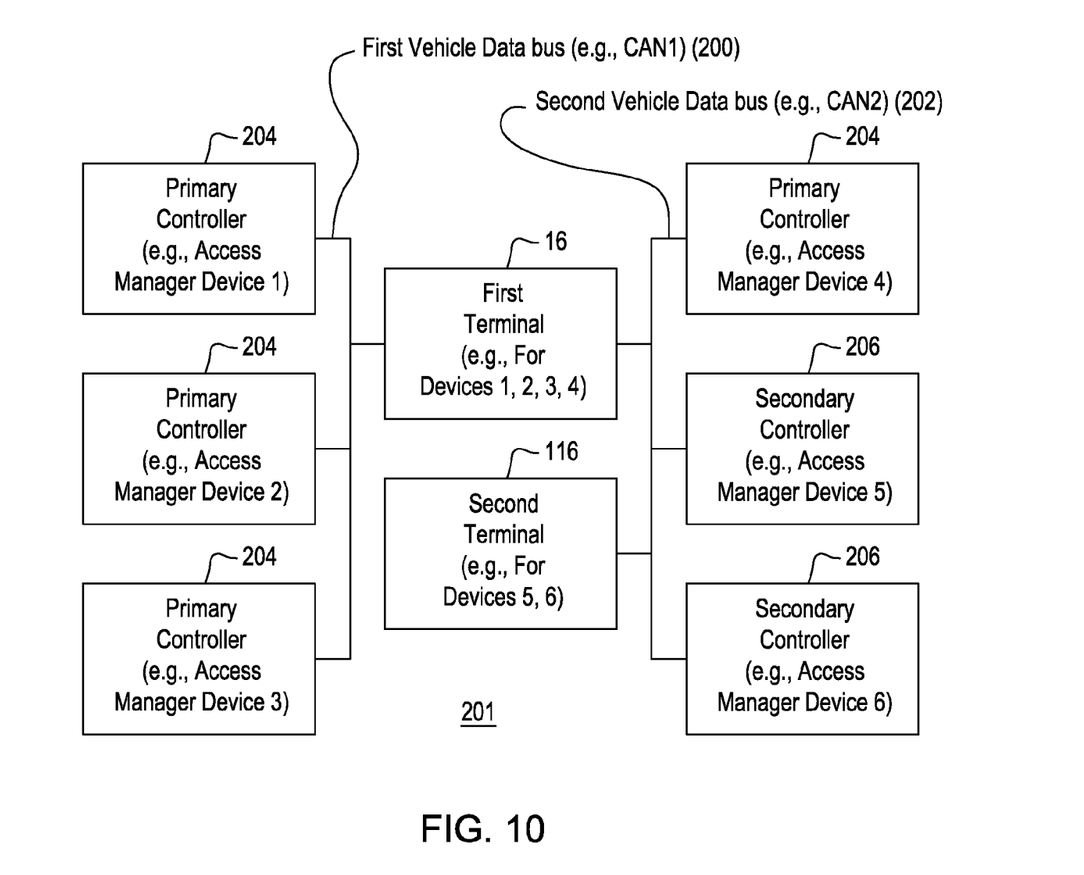
FIG. 10 is a block diagram of an alternate embodiment of a system for managing a display of a terminal device associated with one or more vehicle data buses.

FIG. 10 illustrates an alternate embodiment of the invention. One or more primary controllers 204 are coupled to a first vehicle data bus 200 on a work vehicle. One or more secondary controllers 206 are coupled to a second vehicle data bus 202 on the same work vehicle. The first vehicle data bus 200 and the second vehicle data bus 202 are installed on the same work vehicle. A first terminal 16 is coupled to the first vehicle data bus 200 and the second vehicle data bus 202, whereas the second terminal 116 is coupled to second vehicle data bus 202, for example. The first vehicle data bus 200 and the second vehicle data bus 202 may each comprise a Controller Area Network (CAN) data bus, an ISO bus, Ethernet or another data bus that is suitable for use on a vehicle.

The first terminal 16 is capable of communicating with a primary controller 204, a secondary controller 206 or both. The second terminal 116 is capable of communicating only with the secondary controllers (204 or 206) via the second vehicle data bus 202. As illustrated in FIG. 10, the first terminal 16 may be configured to communicate with the primary controllers 204 that include at least an access manager device 1, an access manager device 2, an access manager device 3, and an access manager device 4. The second terminal 116 may be configured to communicate with the secondary controllers 206, such as the access manager device 5 and access manager device 6.

To the extent that the primary controllers 204 and secondary controllers 206 and associated data buses (200, 202) use ISO 11783, Part 6, each controller can only publish its locked settings or authorized features for a corresponding user to a single terminal (e.g., the first terminal 16 or the second terminal 116). The controller (204, 206) determines which terminal (16 or 116) that it connects to by default, but the technician or administrator can override the initial settings. If the second terminal 116 is removed from the system of FIG. 10, the secondary controllers 206 (labeled access manager device 5 and access manager device 6) will be triggered to re-communicate their permission data, lockout settings to the first terminal 16 without any loss of data or security changes on authorization for the corresponding users. The first terminal 16 that remains connected to the data buses (200, 202) will receive its lockout settings and permission data from the secondary controllers 206 (labeled access manager device 5 and access manager device 6) without disruption or discontinuity of any security authorizations or user levels in a transparent, convenient fashion for the user.

Having described the preferred embodiment, it will become apparent that various modifications can be made without departing from the scope of the invention as defined in the accompanying claims.

The following is claimed:

1. A method for managing a display of a terminal device for use in conjunction with one or more work vehicles, the method comprising:
   supporting communication of the terminal device with one or more first controllers of a first work vehicle via a first data bus or with one or more second controllers of a second work vehicle via a second data bus, wherein the terminal device comprises a portable terminal device that can be moved from the first work vehicle to the second work vehicle;
   determining a user level of a user of the first work vehicle or the user of the second work vehicle based on an identity of the user as verified by an authentication process, storing the identity and user level of a corresponding user in the terminal device, the user level based on diagnostic test results administered by first vehicle electronics of the first work vehicle or a work vehicle simulator to simulate operation of the first work vehicle to prevent damage or misuse to the first work vehicle;
   retrieving permission data on first enabled features and first disabled features for the first work vehicle and an implement of the first work vehicle from the one or more first controllers based on the determined user level or retrieving the permission data on second enabled features and second disabled features for the second work vehicle from the one or more second controllers based on the determined user level; and
   displaying the first enabled features or second enabled features on a display associated with the terminal device consistent with the retrieved permission data.

2. The method according to claim 1 wherein the first enabled features comprise objects for display on the display consistent with International Organization for Standardization (ISO) 11783, Part 6.

3. The method according to claim 2 wherein the second enabled features comprise objects for display on the display consistent with International Organization for Standardization (ISO) 11783, Part 6.

4. The method according to claim 1 further comprising:
   hiding disabled features on the display associated with the terminal device consistent with the retrieved permission data.

5. The method according to claim 1 further comprising:
   establishing a virtual terminal plus mode in which a user can create or modify permission data stored in the first controllers, wherein the virtual terminal plus mode is compatible with a virtual terminal mode supported under International Organization for Standardization (ISO) 11783, Part 6.

6. The method according to claim 1 further comprising:
   prohibiting modification or creation of permission data stored in the first controllers in a virtual terminal standard mode as defined under virtual terminal specifications set forth in International Organization for Standardization (ISO) 11783, Part 6.

7. The method according to claim 1 wherein each first controller creates permission data associated with numerical values representative of an enabled feature or a disabled feature of the work vehicle or the implement associated with the work vehicle.

8. The method according to claim 7 further comprising:
   preventing a user from accessing or controlling disabled features of the work vehicle in accordance with the numerical values.

9. The method according to claim 1 further comprising:
   supporting a first terminal capable of communicating via a first data bus and a second data bus and a second terminal capable of communicating via the second data bus;
   communicating permission data or lockout settings for a corresponding user from a primary controller to a remaining terminal if the second terminal is disconnected from the second data bus.

10. A system for managing a display of an electronic terminal for use in conjunction with one or more work vehicles, the system comprising:
    at least one first controller, associated with a first work vehicle, or at least one second controller, associated with a second work vehicle;
    a first data bus of the first work vehicle or a second data bus of the second work vehicle;
    a terminal for communicating with the at least one first controller of the first work vehicle via the first data bus or with the at least one second controller of the second work vehicle via the second data bus, wherein the terminal device comprises a portable terminal device that can be disconnected, physically or wirelessly, and moved from the first work vehicle to the second work vehicle;
    a data processor, of the at least one first controller or of the at least one second controller, for determining a user level of a user of the first work vehicle or of the second work vehicle based on an identity of the user as verified by an authentication process;
    an electronic device for storing the identity and user level of a corresponding user in the terminal device, the user level based on diagnostic test results administered by first vehicle electronics of the first work vehicle or a work vehicle simulator to simulate operation of the first work vehicle to prevent damage or misuse to the first work vehicle;
    a data port of the terminal device capable of retrieving or receiving permission data on first enabled features and first disabled features for the first work vehicle and an implement of the first work vehicle from the at least one first controller based on the determined user level and the data port capable of retrieving or receiving permission data on second enabled features and second disabled features for the second work vehicle from the one or more first controllers based on the determined user level; and
    a user interface of the terminal for displaying the first enabled features or the second enabled features on a display associated with the terminal device consistent with the retrieved permission data.

11. The system according to claim 10 wherein the first enabled features comprise objects for display on the display consistent with International Organization for Standardization (ISO) 11783, Part 6.

12. The system according to claim 10 wherein the second enabled features comprise objects for display on the display consistent with International Organization for Standardization (ISO) 11783, Part 6.

13. The system according to claim 10 further comprising:
a data processor of the terminal instructing the display to hide disabled features on the display associated with the terminal device consistent with the retrieved permission data.

14. The system according to claim 1 further comprising:
a data processor of the at least one first controller for establishing a virtual terminal plus mode in which a user can create or modify permission data stored in the at least one first controller, wherein the virtual terminal plus mode is compatible with a virtual terminal mode supported under International Organization for Standardization (ISO) 11783, Part 6.

15. The system according to claim 1 further comprising:
a data processor of the at least one first controller for prohibiting modification or creation of permission data stored in the at least one first controller in a virtual terminal standard mode as defined under virtual terminal specifications set forth in International Organization for Standardization (ISO) 11783, Part 6.

16. The system according to claim 10 wherein each first controller creates permission data associated with numerical values representative of an enabled feature or a disabled feature of the work vehicle or the implement associated with the vehicle.

17. The system according to claim 16 where each first controller is instructed to prevent a user from accessing or controlling disabled features of the work vehicle in accordance with the numerical values.

18. The system according to claim 10 wherein the terminal device stores an access manager application and a virtual terminal application in the electronic device.

19. The method according to claim 1 wherein at least one of the first enabled features is indicated by an unlocked symbol on the display and wherein at least one of the first disabled features is indicated by a locked symbol on the display.

20. The system according to claim 10 wherein at least one of the first enabled features is indicated by an unlocked symbol on the display and wherein at least one of the first disabled features is indicated by a locked symbol on the display.

* * * * *